(No Model.) 2 Sheets—Sheet 1.
R. S. JENNINGS.
METHOD OF AND MEANS FOR TREATING AIR FOR DRYING PURPOSES.
No. 303,162. Patented Aug. 5, 1884.
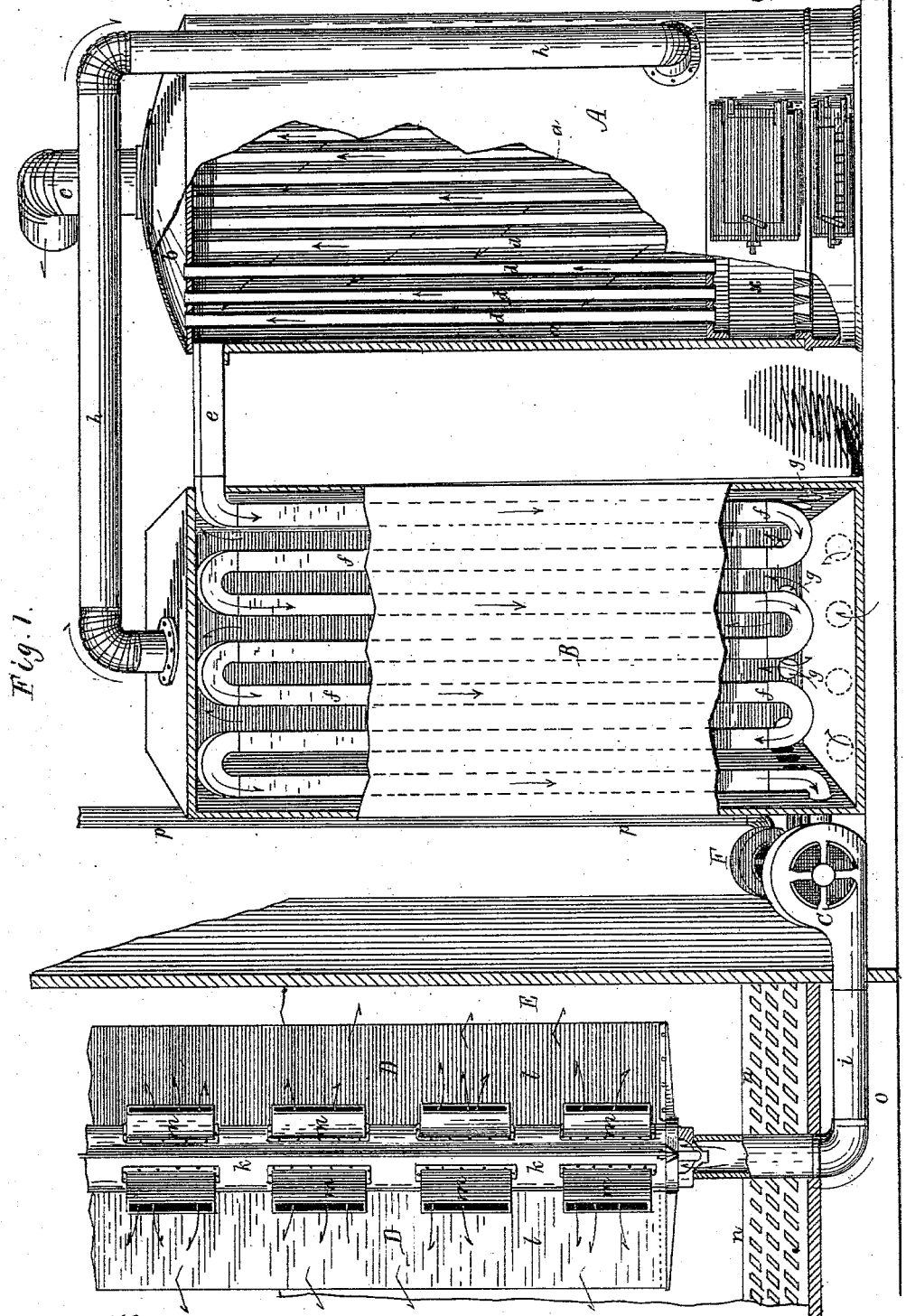
Witnesses:
S. N. Piper
E. B. Pratt
Inventor:
Ralph S. Jennings.
by R. H. Eddy atty.

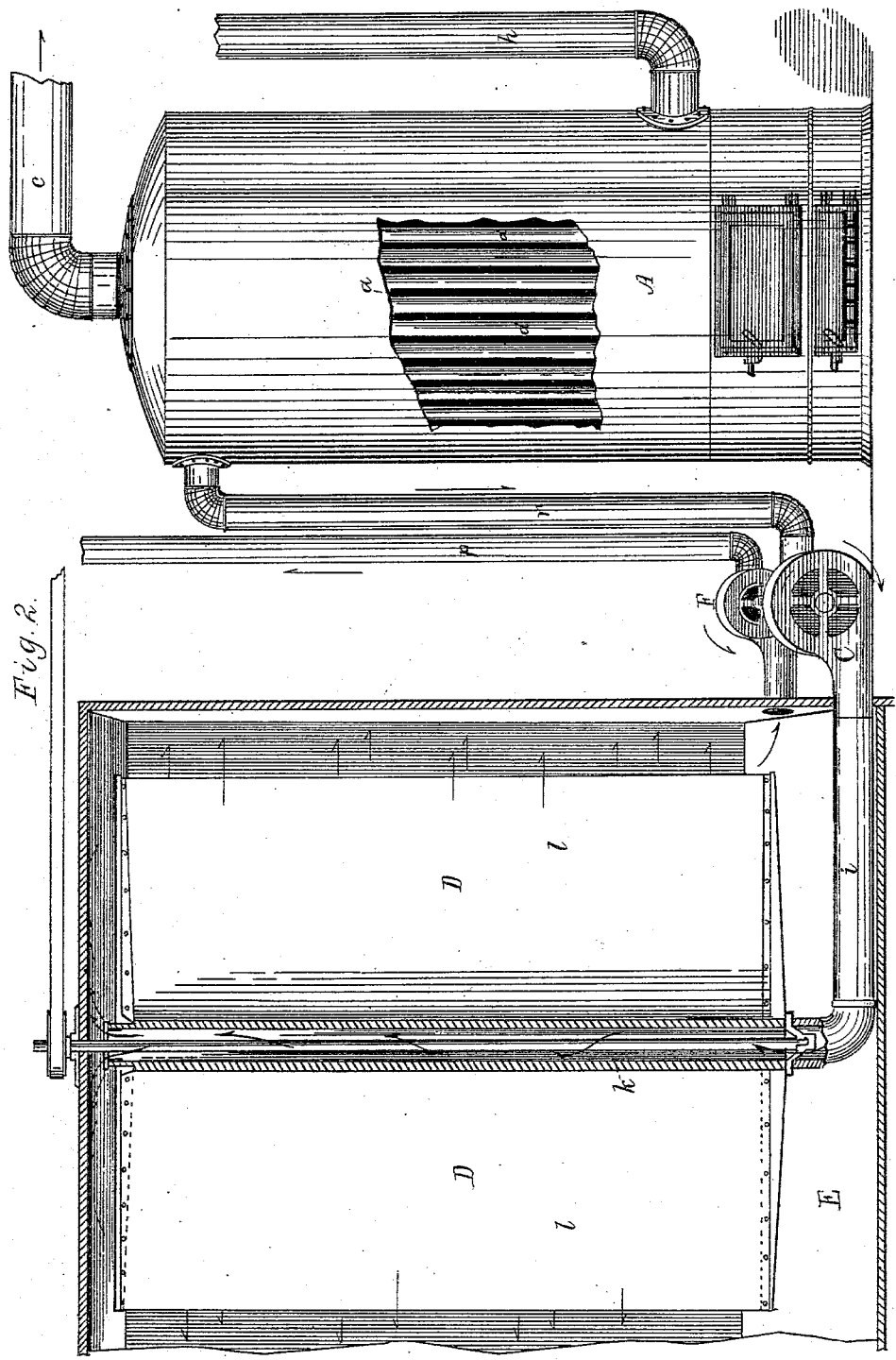

UNITED STATES PATENT OFFICE.

RALPH S. JENNINGS, OF BALTIMORE, MARYLAND.

METHOD OF AND MEANS FOR TREATING AIR FOR DRYING PURPOSES.

SPECIFICATION forming part of Letters Patent No. 303,162, dated August 5, 1884.

Application filed June 23, 1882. (No model.) Patented in England September 23, 1882, No. 4,546; in France September 26, 1882, No. 151,281; in Germany September 26, 1882, No. 23,666, in Belgium September 26, 1882, No. 59,120, and in Newfoundland February 6, 1883.

*To all whom it may concern:*

Be it known that I, RALPH S. JENNINGS, of the city and county of Baltimore, of the State of Maryland, have invented a new and useful Improvement in Means or Apparatus for Treating Atmospheric Air to Render it Useful in the Arts as a Drier; and I do hereby declare the same to be described in the following specification and represented in the accompanying drawings, of which—

Figures 1 and 2 are sectional elevations of two forms or constructions of apparatus embracing my invention.

In Figs. 1 and 2 of the drawings, A represents a furnace for heating air, such furnace having immediately over its fire-place $x$ a chamber, $a$, over which is a smoke-receiving chamber, $b$, provided with a discharge flue or pipe, $c$. From the fire-chamber a series of pipes, $d$, of iron or other oxidizable material extend to the smoke-chamber and upward through the chamber $a$, the whole being so arranged that the smoke and volatile products of combustion from the fire-place, when the furnace may be in operation, shall flow through the pipes $d$ and into the smoke-chamber.

In Fig. 1 a pipe, $e$, is shown as leading out of the upper part of the chamber $a$ and into a serpentine coil or pipe, $f$, arranged within a case, B, which at its lower part is provided with one or more air-inlets, $g$. Out of the upper part of the case B a pipe, $h$, leads to the lower part of the chamber $a$. Furthermore, the coil $f$ at its lower end communicates with a blower, C, for drawing air from the coil and discharging it, by an educt, $i$, into the vertical tubular shaft $k$ of a rotary fan, D. This fan is provided with a series of wings or vanes, $l$, arranged radially to the said shaft $k$. Between those wings there project from the shaft a series of curved educts, $m$, from which, when the fan may be in revolution, air from the shaft is discharged against the vanes $l$, in order for it to be deflected from and thrown off by them or diffused to advantage into the drying room or apartment E, in which the fan may be situated. In the lower part of the said apartment is a perforated or foraminous auxiliary floor, $n$. A blower, F, is to communicate with the space $o$ beneath the auxiliary floor, the eduction-pipe $p$ of said blower being extended upward, as represented.

From the above it will be seen that when there may be fuel in combustion in the fire-place of the furnace and the two blowers and the rotary fan are put in operation by power suitably applied to them, the pipes $d$ are raised to such a temperature that they become oxidized by taking oxygen from the moisture. The remaining constituent of the moisture with the heated air will be driven into and through the tubular coil, and will heat it, whereby it will be caused to heat the air that may be flowing through the coil-case, which air thus heated will be drawn out of the upper part of such case, and into and through the moisture-decomposing chamber $a$. The air and gases reduced to a low temperature—say about 100° Fahrenheit, or less if required—will by the blower be extracted from the coil and driven into and out of the fan-shaft. The fan in revolving will diffuse the air through the drying-room and upon the goods, articles, or materials therein to be dried. The air, charged with moisture rapidly evaporated from such materials, will be extracted from the drying-apartment by the exhausting-blower. In this way atmospheric air charged with humidity can have the latter decomposed, and with the air be economically utilized, as stated.

In Fig. 2 the coil and its case are not represented, the exhaust-blower of such, as shown in Fig. 1, being exhibited as communicating by a pipe, $r$, with the upper part of the air-heating chamber of the furnace. The rotary fan of the drying-chamber is without the curved educts to its hollow shaft, which is open at its upper end in order that the air may escape therefrom between the vanes of and be diffused or thrown from them while they may be in revolution. The shaft may, however, be provided with lateral educts.

It is obvious that if by frequent use the pipes $d$ become damaged through oxidation, new ones may be inserted.

As this case, so far as the process is concerned, relates to the removal of moisture from the air by causing the decomposition of said moisture by means of very highly-heated metallic surfaces, I do not herein claim the process of removing moisture from the air by first heating the air and said moisture and subsequently condensing the moisture therefrom, or the process of heating the air to lower the relative humidity, and then cooling to allow an accurate and convenient regulation of the temperature, as I have made these features the subject-matter of another application for patent which I have filed, Serial No. 86,026, filed February 23, 1883. It will be seen, however, that the apparatus herein shown might be employed regardless of the special features of any particular process, and therefore in the claims relating to the apparatus I do not wish to be limited to the special process made the subject-matter hereof.

I am aware of the fact that use has been heretofore made of devices for accomplishing the following results in succession, namely: first heating air, then passing it through lime, then cooling the air, then again passing it through lime in order that it may be disinfected, and I do not claim such process or apparatus as my invention; but it is well known to those acquainted with the matter of drying that the use of hygroscopic agents—such as lime, sulphuric acid, &c.—are very objectionable, not only on account of the fact that they tend to charge the air with particles of a character such that they are very deleterious when coming in contact with delicate materials to be dried, but also from the fact that their use renders it impossible to treat a large volume of air rapidly, as the same cannot be forced through them by any known means, except upon a scale so small that the apparatus is not efficient for drying purposes. In my case the air is heated not for the purpose of merely affecting the spores of organic matter which may be therein contained, but heated sufficiently high to decompose the moisture therein contained, and after leaving the heater it is carried not to a mass of lime, but, in the condition in which it leaves the furnace, is taken directly to the cooler, and in the condition in which it leaves the cooler is taken directly to the drying-room, so that by this process there are no particles of deleterious matter taken up to affect the materials which are being dried.

I do not in this case claim any of the matters which are claimed in my other pending applications, respectively numbered 73,148, 86,026, 86,318, 86,319, 87,468, 87,469, 97,493, 98,699, 106,070, 103,414, 106,832, 121,265, 121,424, 124,692, preferring to claim herein only the matters set forth in the following claims, and reserving to myself the right to claim in said other applications the matters therein shown and described and not herein claimed.

What I claim as my invention is as follows, viz:

1. In an apparatus for preparing air to be used for drying or treating materials in an inclosed apartment, the combination of an air-heater, an air-cooler outside of the furnace, an unobstructed duct between the heater and the cooler, which carries the air in the condition it leaves the furnace directly to the cooler, and an unobstructed duct which carries the air from the cooler directly to the aforesaid apartment in the condition in which it leaves the cooler, substantially as set forth.

2. In an apparatus for drying moist articles, the combination of an air-heating furnace, the cooling-chamber outside of the furnace, the interior duct within said cooling-chamber, the ducts which carry the air directly from the furnace to the cooler, and the exhaust-fan which draws the air from the cooler, substantially as set forth.

3. The herein-described method or process of preparing air to be used in drying or treating materials, it consisting in subjecting the air to the action of highly-heated metallic surfaces, whereby the decomposition of the moisture can be effected, then carrying the air through an unobstructed duct in the condition in which it leaves the heater directly into contact with cooling-surfaces outside of the furnace, then delivering the air, after being sufficiently cooled, directly into the apartment where the articles are being dried, substantially as set forth.

4. The herein-described method or process of treating the air, it consisting in first heating said air and then passing it through a duct or ducts outside of the furnace, which are kept at a low temperature by means of other currents of air outside of said duct or ducts, substantially as set forth.

RALPH S. JENNINGS.

Witnesses:
R. H. EDDY,
E. B. PRATT.